US008332479B2

(12) United States Patent
Oertig et al.

(10) Patent No.: US 8,332,479 B2
(45) Date of Patent: Dec. 11, 2012

(54) ENTERPRISE APPLICATION SERVER SYSTEM AND METHOD (75) Inventors: Roland Oertig, Basserdorf (CH); Andrei Haber, Fribourg (CH); Gabriel Antonescu, Penthalaz (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 1138 days.

(21) Appl. No.: 11/213,490

(22) Filed: Aug. 26, 2005

(65) Prior Publication Data
US 2007/0050484 A1 Mar. 1, 2007

(51) Int. Cl.
*G06F 15/16* (2006.01)
(52) U.S. Cl. ........ 709/217; 709/220; 709/221; 709/222; 714/12; 714/15
(58) Field of Classification Search .................. 709/217, 709/220, 221, 222; 714/12, 15
See application file for complete search history.

(56) References Cited

U.S. PATENT DOCUMENTS

| 5,951,694 | A | 9/1999 | Choquier et al. |
| 7,412,492 | B1* | 8/2008 | Waldspurger .................. 709/216 |
| 2005/0081097 | A1* | 4/2005 | Bacher et al. .................... 714/13 |
| 2005/0114871 | A1* | 5/2005 | Wolff et al. .................... 719/331 |
| 2006/0031237 | A1* | 2/2006 | DeAnna et al. ............... 707/100 |
| 2007/0033247 | A1* | 2/2007 | Martin .......................... 709/201 |

FOREIGN PATENT DOCUMENTS
WO  WO 03/091892  11/2003

OTHER PUBLICATIONS

International Searching Authority, "Notification of Transmittal of the International Search Report and the Written Opinion of the International Searching Authority, or the Declaration," (PCT Rule 44.1), International Application No. PCT/US2006/031225, mailed Jan. 30, 2007, 14 pages, Mailed Jan. 30, 2007.
Fuente et al., "Raws: Reflective Engineering for Web Services," Proceedings of the IEEE International Conference on Web Services, San Diego, CA, Jul. 6-9, 2004, pp. 488-495, Jul. 6, 2004 through Jul. 9, 2004.

* cited by examiner

*Primary Examiner* — Dustin Nguyen
*Assistant Examiner* — Cheikh Ndiaye (57) ABSTRACT An application server system includes a main server and one or more clients controlled by the main server. The clients execute one or more applications in one or more virtual client environments. Each virtual client environment includes a lightweight server operable to instantiate one or more application objects in response to receiving configuration information from the main server. The application objects are each associated with an application being executed at the client. The application objects store operating information related to the associated application. The lightweight server is further operable to receive operating information from the application objects relating to the operation of the associated applications and to communicate the received information to the main server. Furthermore, the lightweight server is operable to control the applications based on at least one of: (i) the configuration information received from the main server and (ii) further instructions received from the main server after instantiation of an application object.

24 Claims, 3 Drawing Sheets

ENTERPRISE APPLICATION SERVER SYSTEM AND METHOD

TECHNICAL FIELD

This disclosure relates generally to the field of software operational environments and more specifically to an enterprise application server system and method.

BACKGROUND

Particular business operations require numerous applications to perform the various functions of the business (or a particular aspect of the business). A problem arises in such circumstances since all of these various applications need to be controlled and handled, with each application potentially having its own way of handling operation and "bookkeeping" mechanisms (synchronization, multiprocessing, timing) in addition to the associated business tasks. In addition, the various applications may have separate instances each customized for a particular customer of the business. The individual management of these applications leads to a lack of productivity since the business functionality of the applications is intertwined with operating system-dependent tasks in the code of each application. A primary obstacle is the complexity inherent to the operating conditions of the system.

Existing application server technologies, such as Java 2 Platform Enterprise Edition (J2EE) and Microsoft's Net, are intended to provide an infrastructure for network-distributed applications that share data across an enterprise. However, neither of these technologies provide a way to control the applications from the infrastructure. Furthermore, neither help to discharge the application programmer from the tasks of the system programmer or offer a unified technique that is not application-related for handling the applications' "bookkeeping" and monitoring requirements.

SUMMARY

An enterprise application server system and method are provided. According to one embodiment, an application server system includes a main server and one or more clients controlled by the main server. The clients execute one or more applications in one or more virtual client environments. Each virtual client environment includes one or more application objects that are each associated with an application being executed at the client. The application objects store operating information related to the associated application. Each virtual client environment also includes a lightweight server operable to instantiate the application objects in response to receiving configuration information from the main server, to receive operating information from the application objects relating to the operation of the associated applications, and to communicate the received information to the main server. Furthermore, the lightweight server is operable to control the applications based on at least one of: (i) the configuration information received from the main server and (ii) further instructions received from the main server after instantiation of an application object.

Certain embodiments of the present invention may include one or more of the following technical advantages. For example, the enterprise application server (EAS) system according to particular embodiments supports easy assembling, deploying and maintenance of scalable multi-tier applications across an enterprise. Such an EAS system is server-based and helps separate the business functionality that is implemented in the application modules of the system from the management of the application modules. The EAS system uses an additional level of abstraction (meta-information) that allows the independent definition of both an application's business functionality and its deployment.

This architecture leads to several advantages. For example, since the business logic is isolated from services and platform-related code, this discharges developers from deployment and reliability issues, creates higher reliability of overall system, and allows applications to be more easily deployed in different environments. In an environment (such as an enterprise) that needs to run a large number of different applications, the ability to re-use service and deployment tools can lead to a considerable savings of programmer time and a very short time-to-market due to the available flexibility. Furthermore, the EAS architecture described above provides hardware independence and scalability with respect to the applications, data and persistency model. In addition, the architecture provides higher availability of the overall system through integrated services for state maintenance, multi-level monitoring, business-dependent activity value collections, reporting, and quality-measurement. The system also provides fault-independence via single exit point, improved system performance via definition of data processing units for applications, and clustering, fail-over and load balancing features.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

Figure 1:
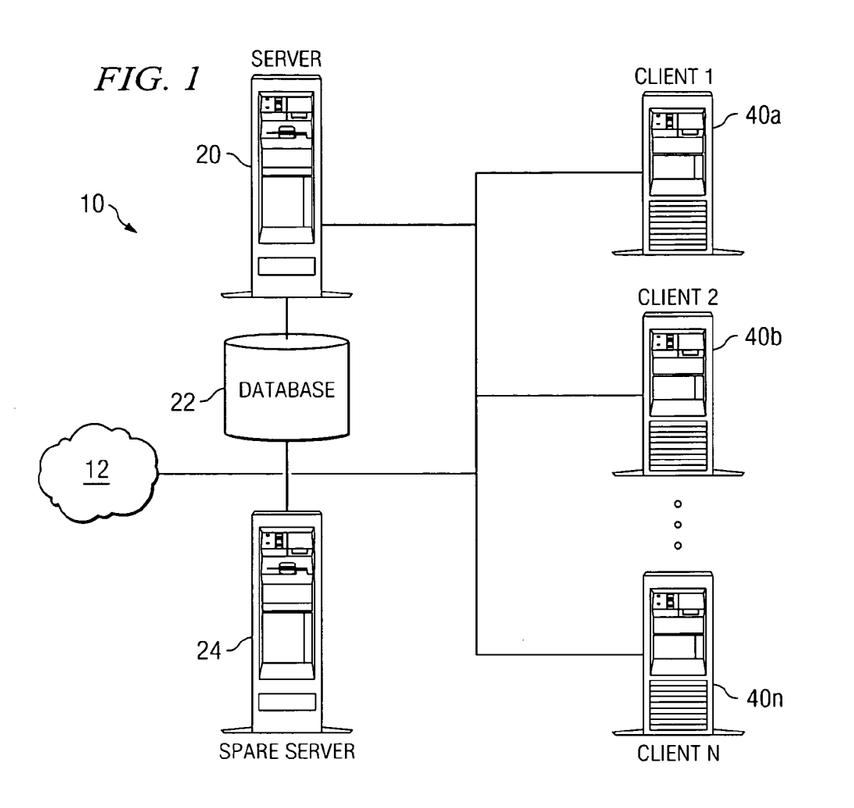
FIG. 1 illustrates an enterprise application server (EAS) system according to one embodiment of the present invention.

FIG. 1 illustrates an enterprise application server (EAS) system 10 according to one embodiment of the present invention. The EAS system 10 provides a distributed operational environment for assembling, deploying, and maintaining scalable multi-tier applications across an enterprise or other suitable entity or entities (including providing load balancing and hardware failure recovery). The EAS system 10 acts as a server-centric virtual application server that keeps the business functionality that is implemented within the applications separate from the management of the applications. The system 10 is implemented as middleware—an intermediate layer between the applications and the operating system that is running on the various components of the system 10. The EAS system 10 uses a level of abstraction (meta-information) that allows the independent definition of both an application's business functionality and its deployment. The meta-information is the information about the applications and their processes and about groups of applications running together (defined as "jobs") that allows the EAS system 10 to handle the applications. As is described below, the objects containing and handling the meta-information includes application objects, process companions, and jobs. These objects are controlled by the EAS system 10 and respond to the control in a specific way according to the associated application's object class definition.

From the perspective of the operating system, the EAS system 10 is seen as a set of processes, such as Lisp (list processing language) processes, running on a distributed network. From the perspective of the application side, the system 10 is seen as an operating system-like infrastructure providing access to various services. From the perspective of the EAS system 10, the applications are seen as data on which the system acts according to a defined protocol. In particular embodiments, the EAS system is a set of Lisp "worlds" running distributed on a network of computers. From outside the operating system, a "world" is seen as one of the programs running on a computer. From inside the operating system, a world is an environment that contains programs threads and data that are self-contained. The worlds can be replicated and tuned for specific uses. Each of these worlds runs programs used as an infrastructure for the execution of the applications that use this infrastructure as if it were the operating system itself. The infrastructure is itself programmable separately from the applications. The worlds contain both the infrastructure and the applications. The applications follow a protocol that allows their behavior to be controlled from the infrastructure level. Although Lisp is used as an example, the EAS system 10 may be implemented using any suitable general-purpose programming language (such as C++, Java, Delphi, SmallTalk, or C#) that offers multiprocessing and object-orientation with multiple inheritance. In addition, a Lisp-implemented EAS system may also handle applications other than Lisp applications (such as C++ or Java application) provided that it follows the appropriate protocol and interfaces.

The EAS system 10 includes several components that cooperate in order to provide application handling. These components include a main server 20 that manages the distribution of virtual client environments over various client computers 40. The client computers 40 are seen by the main server 20 as a pool (farm) of computers on which the virtual client environments may be executed and managed. Each virtual client environment is used to run one or more applications for users associated with a client computer 40. Multiple distinct virtual client environments may be executed in the same client computer 40 with completely different applications and different settings. In particular embodiments, each virtual client environment may be a separate Lisp world that is managed by the main server 20. As described in further detail in conjunction with FIGS. 3 and 4, the applications running on a virtual client environment are controlled by a component called a lightweight server that handles application objects associated with each application. The application objects are data elements that are tied to the applications. The application objects store all the application-related information in order for the EAS system 10 to properly handle the application. Each application may run one or more processes (for example, tasks or threads) that have an associated data element—the process companion. Each process is tied to its companion so that its activity may be controlled and monitored by actions applied to the process companion by the lightweight server. The application object may perform bookkeeping of the processes running via a table identifying the process companions.

At any time, a new application class can be defined by sub-classing from the basic application class and a specific EAS handling protocol can be assigned to the new class. Applications may be characterized at the meta-information level (using application objects) by:

i. Their kind (which defines the behavior of the EAS system 10 with respect to it);
ii. Their timings;
iii. The application and job-specific file pathname allocations;
iv. The set of customizations applied to the applications;
v. The characterization of their threads (a "main process" function and the "additional process" function for the multiprocessing applications);
vi. The dependencies with respect to other applications (when an application is defined to depend on others, the EAS system 10 may automatically synchronize them without intervention at the application level such as the dependency chain be followed);
vii. Information concerning tracing and monitoring of each application's process;
viii. The application's process companions that handle information about each of the application's processes (tasks); and
ix. Specific customization information for the application's job (which is collection of applications running for the same customer and in the same virtual client environment) specific customization information.

The main server 20 performs load balancing by attempting to keep the virtual client environments uniformly distributed over the client computers 40. Furthermore, if one of the client computers 40 crashes, then the main server 20 redistributes the virtual client environments that used to run on that computer 40 to the remaining client computers 40 (thus providing failure protection). The main server 20 has an associated main server database 22 that may be used to store data used by the main server to manage the various virtual client environments and application instances running in the virtual client environments, as described in detail below. The database 22 may typically be incorporated in the main server 20; however, in particular embodiments the database 22 may be external to the main server 20.

The EAS system 10 may also include one or more spare main server systems 24 that may be used as needed for back-up purposes. All of these various components of the EAS system 10 are coupled via suitable wired or wireless network links. These network links may be a part of any suitable network, such as a local area network (LAN), a metropolitan area network (MAN), a wide area network (WAN), and/or the Internet. Furthermore, the network links coupling the components of the EAS system 10 may themselves be coupled to one or more other networks 12. The main server 20 and client computers 40 may communicate via a messaging subsystem that allows communication between the components independent of their physical location.

The main server 20 and client computers 40 may be implemented using any suitable computing devices that may be physically distributed any appropriate distances from one another (for example, across an enterprise's buildings in the same city or across the world). In particular embodiments, the main server 20 runs on dedicated hardware with special measures taken to prevent it from hardware failures. For example, the main server 20 may implemented so as to have CPU and power supply redundancy and data back-up (for example, using RAID disks). Such precautions are due to the fact that the main server 20 (or associated components, such as database 22) stores all of the deployed software components in the EAS system 10 of particular embodiments, as well as all data created and used by all running applications. However, in such embodiments, the main server 20 does not run any applications (except server software, which coordinates all of the client computers 40 and provides the services needed by the client computers 40). The client computers 40 in these embodiments do not store any deployed EAS software components locally (except for shell scripts) and no applications use the local storage of the associated client computer 40 for any created or used data. Instead, the client computers 40 run the applications as instructed by the main server 20 and use the disk space made available to them on the main server 20. This ensures interoperability between client computers 40.

Figure 2:
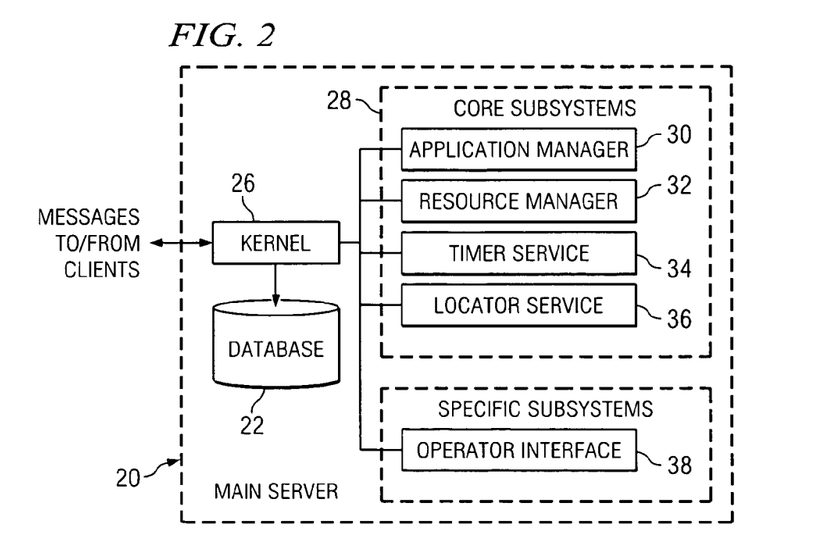
FIG. 2 illustrates the components of an example main server of an EAS system according to one embodiment of the present invention.

FIG. 2 illustrates the components of the main server 20 according to one embodiment of the present invention. The three primary roles of the main server 20 are to control the client computers 40, provide operating system-like resources to the various application running in the EAS system 10, and to provide an operator interface to control and monitor the system's performance. With respect to the first role, the main server 20 may control the client computers 40 in order to start and stop the applications and to ensure load balancing and automatic system reconfiguration in case of hardware failure. The main server 20 may do this both by executing shell scripts on the client computers 40 and by issuing command messages to partner components on the client computers 40. In this respect, the main server 20 performs as a client using the client computers 40 as servers. With respect to the second role listed above, the main server 20 may provide services such as resource locking, timing functions, inter-process communication and synchronization, and disk space allocation to the applications. In this respect, main server acts as a server. The main server 20 may be configured in such a way as to allow expansion with new types of services as those service become needed or available. All these roles of the main server 20 may be performed by a single program (the main server program) running on multiple threads (i.e., processes). In particular embodiments, these multiple threads are run in a single Lisp world.

As illustrated in FIG. 2, the example main server 20 has several functional components to implement the features described above. For example, the main server 20 includes an main server kernel 26 that provides communication of information between the main server subsystems and the client computers 40 and their associated virtual client environments. The kernel 26 also loads and starts the various main server subsystems. The kernel 26 uses the database 22 to maintain various information on the EAS system 10. For example, the kernel 26 may maintain a list of the available client computers 40, the virtual client environments running on the client computers 40, the applications being executed on the virtual client environments, the processes running in the virtual client environments, and the communication channels to these processes.

In addition, the example main server 20 also includes several core subsystems 28. These include an application manager 30, a resource manager 32, a timer service 34, and a locator service 36. The application manager 36 maintains a static list (which may be stored in the database 22) which specifies, for each user/customer of the EAS system 10, what applications must run, which pairs of applications may not run in the same virtual client environment, and how many virtual client environments should run each application (if not just one virtual client environment). The application manager 26 may also maintain an estimation of the number of client computers 40 that are normally available to run applications. Based on this information, the application manager 26 controls the configuration of the client computers 40 available to it (both at start-up and as operational conditions change) in order to promptly adapt to the operational conditions. Specifically, the application manager 26 dispatches applications to available virtual client environments. For example, a new application may be dispatched to an idle virtual client environment or, if not virtual client environments are idle, to a newly created virtual client environment on the least used client computer 40. To perform its control functions, the application manager 26 may construct, maintain and use a dynamic database of information that includes a list of running and connected client computers 40, a list of the one or more virtual client environments of each client computer 40 (for example, identified by its client computer name and its system port) and its attributes (for example, the user on behalf of which the virtual client environment runs and the list of applications run by the virtual client environment), and the average CPU usage statistics for each client computer 40.

The main server 20 may provide a number of services to the applications running on the client computers 40. In embodiments of the EAS system 10 implemented using Lisp, the valid requesters of such services may be the Lisp processes. Every such requester may be identified with one or more attributes, such as the associated virtual client environment, the Lisp process name of the requester, the process type, and the associated user.

One type of service that is provided is resource management (which is provided by the resource manager 32). A resource is a server-owned object that is named by the applications with a string and constructed by the server with that string name upon an application request. The following example services may be offered for a named resource:

Lock—lock a resource on behalf of a process (if a resource is already locked, then the requester is queued in a waiting list);

LockOrExplain—like Lock if the locking can be performed, but if not then the full identity of the current locker of the resource is sent back (instead of placing the requestor in a waiting list);

Unlock—unlock a resource hold by a process or remove that process from the waiting list for that resource; and Cleanup—clean up the locks in case of process, virtual client environment or client computer malfunctions (may also solve possible deadlocks).

The main server 20 may also provide a timer service 34. The timer service 34 provides timer functions which are executed as needed. For example, the following services may be offered:

SetTimer—remember a timer interval and a message of arbitrary structure and send that message after the timer interval has expired (the destination of the message may be the requesting process, a process of the same type within the originating virtual client environment, or a process of the same type in any virtual client environment); and KillTimer—kill a previously set timer (i.e., do not send the message any more after timer expiration).

Furthermore, the main server 20 may provide a locator service 36. The locator service 36 allows a process to locate processes of a certain type in another virtual client environment than its own (on the same or another client computer 40). The locator service is used to match processes, which then communicate with each other by their own means (For example, using a messaging subsystem). For example, the following services may be offered:
  LocateOne—locate a process of a certain type outside the virtual client environment of the requester;
  LocateAny—locate all processes of a certain type outside the virtual client environment of the requester.

In addition, the main server 20 may include other subsystems than those described above. For example, the main server 20 may include an operator interface 38 to allow an operator to access and control the main server 20. Any other suitable subsystems may also or alternatively be included.

Figure 3:
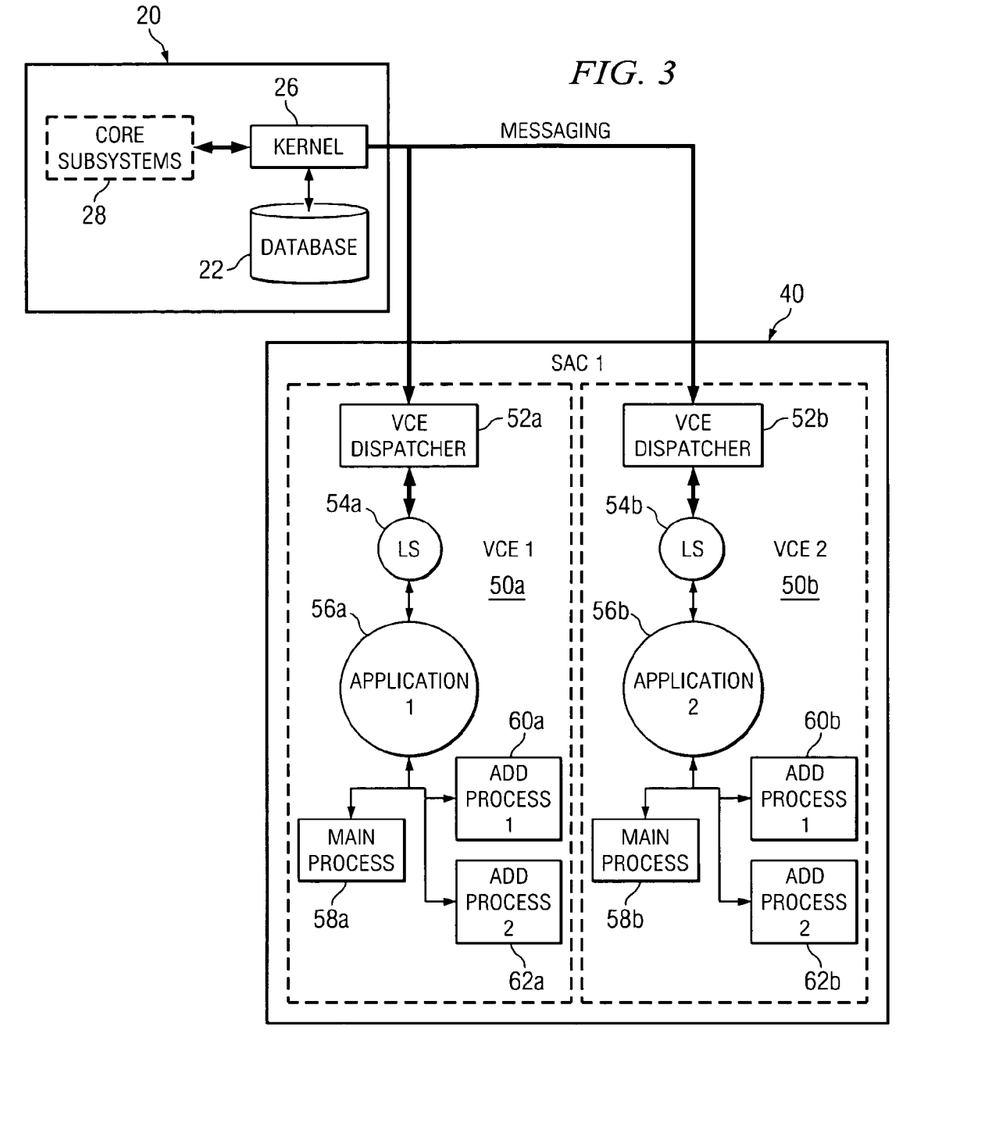
FIG. 3 illustrates the components of an example client of an EAS system and the communication of those components with the main server according to one embodiment of the present invention.

FIG. 3 illustrates the components of an example client computer 40 in further detail and the communication of those components with the main server 20. As described above, the client computers 40 do not store application code or data locally, just the operating system software itself. In particular embodiments, each client computer 40 runs one or more Lisp worlds, which are the virtual client environments 50. In the example that is illustrated, the client computer 40 includes two virtual client environments 50*a* and 50*b*. However, any suitable number of virtual client environments 50 may be run on a particular client computer 40 at a particular time. The virtual client environments 50 are loaded from the main server 20 file system. The virtual client environments 50 then run one or more applications for a user. At start-up, the virtual client environments 50 include two components: a dispatcher 52 and a lightweight server 54. These components form a neutral environment that does not run any application-specific task and that does not correspond to any specific configuration. After start-up, the dispatcher 52 registers with the main server 20 (via a "subscribe" message) so that the main server can dispatch work to the virtual client environment 50. In particular embodiments, the IP (or other network) address and the specific port for the communication with the main server are used to identify a virtual client environment 50 (although any suitable identifiers may be used). After the dispatcher 52 has subscribed to the main server 20, the main server 20 can dispatch the applications to be run by the virtual client environment 50 and their configuration according to the information from the main server database 22. The dispatcher 52 is also responsible for all subsequent communications between the virtual client environment 50 and the main server 20 or other virtual client environments 50 using the messaging subsystem.

The lightweight server 54 is responsible for handling all the application-related activities and provides an interface to declare, create, start, stop, update, describe and monitor applications. This interface consists of specific messages for communication with the main server 20 and of an application programming interface (API) exposed to the applications (which allows, for example, the applications to send service requests, reports, and other information to the main server 20). The lightweight server 54 also implements the concept of "job". A job defines the list of applications that a lightweight server 54 runs for a particular user. Once a virtual client environment 50 is registered with the main server 20, the main server 20 sends a "work" message with all the job-related information that is transmitted to the lightweight server 54 via the dispatcher 52. Upon receiving the "work" message, the lightweight server 54 may then perform the following steps to run one or more applications identified in the work message using the virtual client environment 50. First, the lightweight server 54 initializes the name of the job and of the user (this makes the job and user-specific locations, such as files and directories, in the main server file system available to the virtual client environment 50). The lightweight server 54 then loads specific information needed to configure the applications and starts system-related processes (processes used for monitoring, tracing, gathering statistics, etc.). Then, for each application identified in the job, the lightweight server 54 instantiates an application object 56 (an instance of the application) according to the received configuration information, starts the application, and notifies the main server 20 that the application has been started. Each application object 56 will have at least a main process 58 and may also have one or more additional processes (two additional processes 60 and 62 are illustrated as an example). Each process may have an associated function. Furthermore, although each virtual client environment 50 and corresponding lightweight server 54 is illustrated as running only one application in FIG. 3, any suitable number of applications and associated processes may be run in a single virtual client environment 50.

After starting the application object 56 and running the main process 58 (and possibly additional processes), the lightweight server 54 manages the application according to the defined configuration and processes message received from the main server 20 associated with the application. During this time, the lightweight server 54 can provide information about the user, applications, and processes associated with the virtual client environment 54 to the main server 20. For example, the lightweight server 54 updates the information about the state of the applications and sends messages to the main server 20 in order to keep the centralized information consistent. Control of the applications is maintained via a set of methods defined in the lightweight server 54 and application objects 56 that allow starting and stopping, timing, dynamic re-configuration, tracing, monitoring and statistics collection on an application-specific basis without intervention in the code of the application. The application handling may further include specialization of the methods that implement the lightweight server functionality on application object subclasses, thus allowing the way an application or a set of applications is deployed to be changed without any intervention in the application code.

From the perspective of the application programmer, the lightweight server 54 presents an API that abstracts the operating system interface as well as the centralized services offered by the main server 20. For example, the lightweight server API may allow the programmer to access user and application-specific locations in the file system, start additional processes to control multiprocessing, send notification messages to provide communication between applications located on different virtual client environments 50, and collect activity information about applications.

Figure 4:
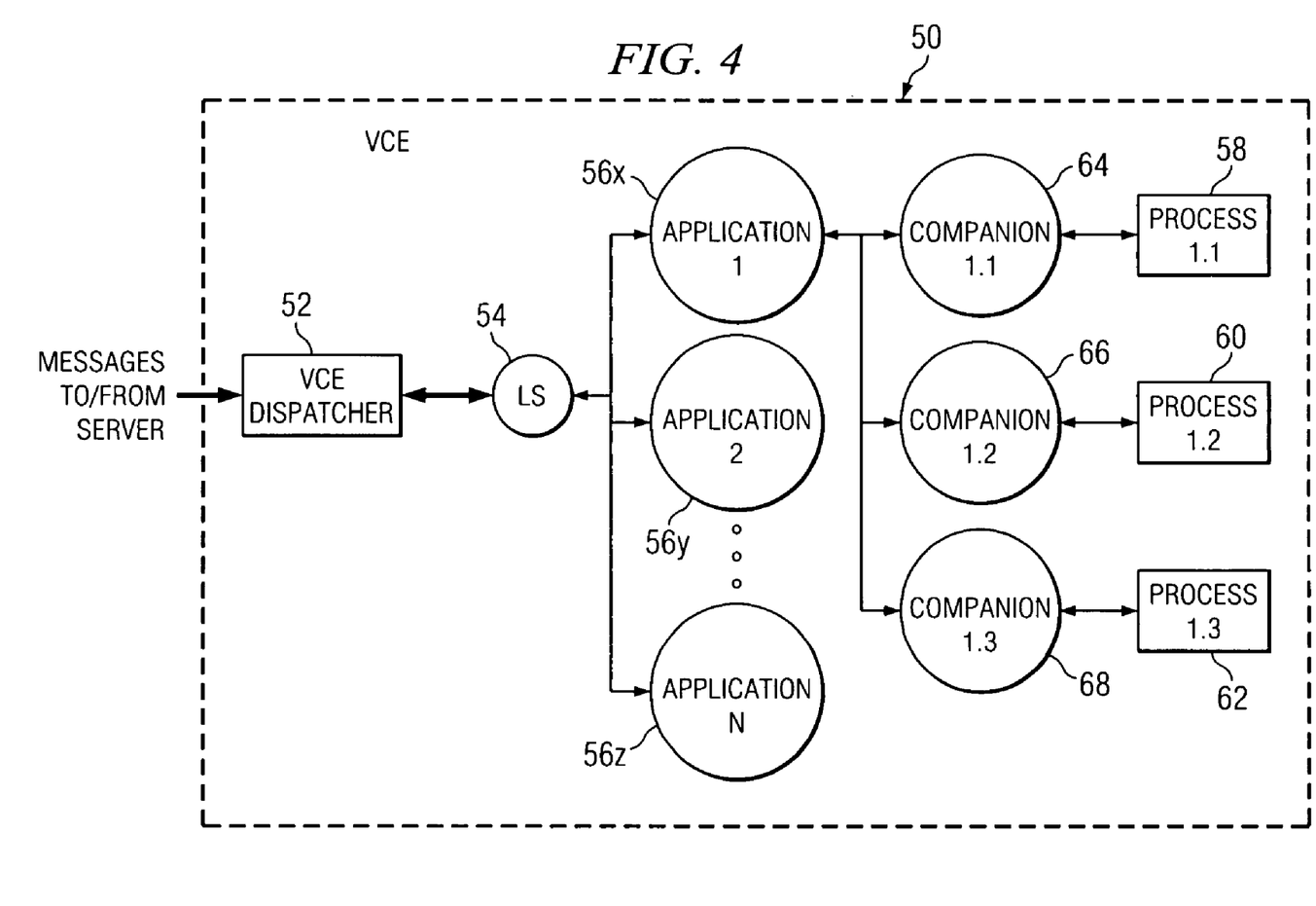
FIG. 4 illustrates the components of an example virtual client environment according to one embodiment of the present invention.

FIG. 4 illustrates the components of an example virtual client environment 50 in further detail. In the illustrated embodiment, the virtual client environment 50 is used to run three different applications 56*x*, 56*y*, and 56*z*. In order to be able to run in a virtual client environment 50, every application 56 has to be declared to the lightweight server 54 in order to provide information related to the way the application 56 is to be deployed. For example, the applications 56 may be described to the lightweight server using the following information:
  Application dependencies: Some applications rely on the completion of other applications. The dependency information is a list of application identifiers that has to complete before the dependent application starts.
  Type of application: There are several type of applications that can be handled specifically by the lightweight server 54 with respect to their evolution in time. For example, these types may include "scheduled", "cycled", "triggered", "always" and "default". This list can be extended according to the specific needs.

Main process and additional process names: These names are used by the lightweight server 54 to pass control to the application code.

Application periodicity: The frequency of re-activation after a task has been completed.

This information may be made available to the lightweight server 54 via the invocation of a "define application" macro and its corresponding passed arguments in the application code. The effect of using such a macro is to declare a subclass and indicate specific information for this class (for example, the name of the main functions for the main process or for the additional processes).

Every application process has an associated process companion. For example, the main process 58 (Process 1.1) has an associated process companion 64 (Companion 1.1), the first additional process 60 (Process 1.2) has an associated process companion 66 (Companion 1.2), and the second additional process 62 (Process 1.3) has an associated process companion 68 (Companion 1.3). Each process is tied to its companion so that its activity may be controlled and monitored by actions applied to the process companion by the lightweight server 54. When an application 56 is started, the lightweight server 54 starts the application's main process. Before the process is started, it is first allocated its companion and the link between the two is registered.

The main function (which is declared as the value of an "main start function" initialization argument provided to "define application" macro) is not started directly. Instead, it is wrapped into a "start main application" method of the application object. This method provides the process' top-level loop in which the "main start function" is called. This means that the preset function of every application's main process is the same and only the "main start function," which is called inside, differs from one application to another. The "start main application" method is not exported, and therefore not accessible for explicit calls from the application code. However, since the "start main application" method is specialized on the application object, it allows overloading for specialization on the subclass that is defined by the "define application" macro. This is a powerful mechanism that allows consistent discrimination in the handling of different application types without changes in the application's code. A similar mechanism is provided for the additional processes, with the exception that the additional processes' main function is not wrapped into a loop. Thus, when an additional process' function exits, the process is de-registered, its companion is released, and the process dies.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An application server system, comprising:
   one or more client computers;
   a centralized main server and database configured to store software components and any data created and used by applications, coordinate the one or more client computers, and provide operating system-like services to the one or more client computers including allocation of disk space in the centralized main server and database to the applications; and
   wherein the one or more client computers are controlled by the centralized main server and database, each client computer of the one or more client computers configured to execute multiple virtual client environments, each virtual client environment of the multiple virtual client environments comprising:
      one or more application objects, each application object of the one or more application objects associated with an application being executed in the virtual client environment and operable to store any data created and used by the associated application on the centralized main server and database;
      a dispatcher configured to register the virtual client environment with the centralized main server and database prior to any application task being dispatched for execution in the virtual client environment and provide subsequent communications between the virtual client environment and the centralized main server and database; and
      a lightweight server operable to:
         communicate, only through the dispatcher, any data created and used by the application objects between the centralized main server and database and the application objects;
         instantiate the application objects in the virtual client environment in response to receiving configuration information from the centralized main server and database;
         receive operating information from the application objects relating to the operation of the associated applications and communicate, only through the dispatcher, the received information to the centralized main server and database; and
         control the associated applications based on at least one of: (i) the configuration information received from the centralized main server and database through the dispatcher and (ii) further instructions received from the centralized main server and database through the dispatcher after instantiation of one of the application objects.

2. The application server system of claim 1, wherein:
   each application of the associated applications has one or more associated processes, each process having an associated process companion; and
   the lightweight server is further operable to control each process by actions applied to the associated process companion.

3. The application server system of claim 2, wherein the application object associated with an application is further operable to identify the processes associated with the application by maintaining a table identifying the associated process companions.

4. The application server system of claim 1, wherein the centralized main server and database comprises an application manager operable to maintain and use a database of information identifying the one or more client computers controlled by the centralized main server and database, the virtual client environments operating in each client computer, and the associated applications in each virtual client environment.

5. The application server system of claim 4, wherein the application manager is further operable to maintain information regarding what applications are to be executed in the application server system, which applications may not be associated with the same virtual client environment, and how many virtual client environments must execute each application.

6. The application server system of claim 4, wherein the application manager is further operable to dispatch an application to a particular virtual client environment of a particular client computer for execution at the client computer.

7. The application server system of claim 4, wherein the application manager is further operable to transfer execution of an application from a first client computer to a second client computer to provide load balancing.

8. The application server system of claim 4, wherein the application manager is further operable to transfer execution of an application from a first client computer to a second client computer in response to a failure of the first client computer.

9. The application server system of claim 1, wherein:
the lightweight server is further operable to receive one or more service requests directed to the centralized main server and database from the associated applications and to forward the service requests to the centralized main server and database; and
the centralized main server and database is operable to provide one or more of the services to the associated applications based on the service requests.

10. The application server system of claim 9, wherein the requested services include one or more of the following services: resource locking, timing functions, and inter-process communications.

11. The application server system of claim 1, wherein the multiple virtual client environments are Lisp worlds.

12. A method of executing applications in an application server system, comprising:
executing multiple virtual client environments at each client of one or more clients controlled by a centralized main server and database system configured to store software components and any data created and used by applications and to coordinate the one or more clients and provide operating system-like services to the one or more clients including allocating disk space in the centralized main server and database to the applications, wherein executing each virtual client environment of the multiple virtual client environments comprises:
associating an application object with an application being executed in the virtual client environment;
storing any data created and used by the associated application on the centralized main server and database system;
registering, via a dispatcher, the virtual client environment with the centralized main server and database system prior to any application task being dispatched for execution in the virtual client environment;
communicating between the virtual client environment and the centralized main server and database system only through the dispatcher; and
executing a lightweight server including:
communicating, only through the dispatcher, any data created and used by the application object between the centralized main server and database system and the application object;
instantiating the application object in the virtual client environment in response to receiving configuration information from the centralized main server and database system;
receiving operating information from the application object relating to the operation of the associated application and communicating, only through the dispatcher, the received information to the centralized main server and database system; and
controlling the associated application based on at least one of: (i) the configuration information received from the centralized main server and database system through the dispatcher and (ii) further instructions received from the centralized main server and database system through the dispatcher after instantiating the application object.

13. The method of claim 12, wherein:
the associated application has one or more associated processes, each process having an associated process companion; and
executing the lightweight server comprises:
controlling each process by actions applied to the associated process companion.

14. The method of claim 13, wherein executing each virtual client environment of the multiple virtual client environments comprises:
maintaining a table identifying the associated process companions via the application object to identify the associated processes of the associated application.

15. The method of claim 12, wherein executing the lightweight server comprises:
receiving one or more service requests directed to the centralized main server and database system from the associated application; and
forwarding the service requests to the centralized main server and database system.

16. The method of claim 15, wherein the requested services include one or more of the following services: resource locking, timing functions, and inter-process communications.

17. The method of claim 12, comprising:
maintaining a database of information via an application manager at the centralized main server and database system, wherein the database of information identifies the one or more clients controlled by the centralized main server and database system, the virtual client environments operating in each client, and the applications executing in each virtual client environment.

18. The method of claim 17, comprising:
maintaining information via the application manager regarding what applications are to be executed in the application server system, which applications may not be associated with the same virtual client environment, and how many virtual client environments must execute each application.

19. The method of claim 17, comprising:
dispatching an application via the application manager to a particular virtual client environment of a particular client for execution at the particular client.

20. The method of claim 17, comprising:
transfering execution of an application from a first client to a second client to provide load balancing via the application manager.

21. The method of claim 17, comprising:
transfering execution of an application via the application manager from a first client to a second client in response to a failure of the first client.

22. The method of claim 12, comprising:
receiving one or more service requests at the centralized main server and database system from the associated application via the lightweight server and;
providing one or more services from the centralized main server and database system to the associated application based on the service requests.

23. The method of claim 22, wherein the one or more services include one or more of the following services: resource locking, timing functions, and inter-process communications.

24. A system, comprising:
a client computer configured to be controlled by a centralized main server and database which stores software components and any data created and used by applications and coordinates operation of the client computer and provides operating system-like services to the client computer including allocation of disk space in the centralized main server and database to the applications, wherein the client computer is configured to support virtual client environments and each of the virtual client environments comprises:
a dispatcher configured to register the virtual client environment with the centralized main server and database prior to any application task being dispatched for execution in the virtual client environment and to provide subsequent communications between the virtual client environment and the centralized main server and database; and
a lightweight server operable to:
communicate, only through the dispatcher, any data created and used by the application objects between the centralized main server and database and the application objects;
instantiate application objects in the virtual client environment in response to receiving configuration information from the centralized main server and database;
receive operating information from the application objects related to the operation of an associated application and communicate, only through the dispatcher, the received operating information to the centralized main server and database; and
control the associated application based on at least one of (i) the configuration information received from the centralized main server and database through the dispatcher and (ii) further instructions received from the centralized main server and database through the dispatcher after instantiation of one of the application objects.

* * * * *

UNITED STATES PATENT AND TRADEMARK OFFICE
CERTIFICATE OF CORRECTION

PATENT NO. : 8,332,479 B2  
APPLICATION NO. : 11/213490  
DATED : December 11, 2012  
INVENTOR(S) : Roland Oertig et al.

Page 1 of 1

It is certified that error appears in the above-identified patent and that said Letters Patent is hereby corrected as shown below:

In column 12, line 54, in Claim 20, delete "transfering" and insert -- transferring --, therefor.

In column 12, line 58, in Claim 21, delete "transfering" and insert -- transferring --, therefor.

In column 14, line 2, in Claim 24, delete "dispatcher." and insert -- dispatcher, --, therefor.

In column 14, line 16, in Claim 24, delete "of" and insert -- of: --, therefor.

Signed and Sealed this  
Twelfth Day of March, 2013

Teresa Stanek Rea  
*Acting Director of the United States Patent and Trademark Office*